United States Patent Office 3,285,984
Patented Nov. 15, 1966

3,285,984
HYDROGENATION OF POLYCYCLIC AROMATICS
Anthony George Goble, Sunbury on Thames, Middlesex, England, assignor to The British Petroleum Company Limited, London, England, a British joint-stock corporation
No Drawing. Filed Dec. 30, 1963, Ser. No. 334,577
Claims priority, application Great Britain, Jan. 11, 1963, 1,339/63
6 Claims. (Cl. 260—667)

This invention relates to the selective hydrogenation of polycyclic aromatics.

It has been previously proposed to hydrogenate naphthalene using a platinum-alumina catalyst. The products from the reaction include both the saturated hydrocarbon decahydronaphthalene (Decalin) and the partially saturated hydrocarbon tetrahydronaphthalene (Tetralin), the relative proportions of each being dependent on the process conditions used.

While mixtures of Decalin and Tetralin may be suitable for certain uses, there may also be occasions when the individual components are required. Conditions have now been found with favour selective hydrogenation and so give Tetralin without substantial amounts of Decalin.

According to the present invention a process for the selective hydrogenation of polycyclic aromatic hydrocarbons comprises contacting the polycyclic aromatics with a catalyst consisting essentially of a platinum group metal on a refractory support at a temperature of from 500 to 900° F. in the presence of hydrogen and a substantial quantity of sulphur, to produce partially hydrogenated hydrocarbons without substantial quantities of fully hydrogenated hydrocarbons.

It has been found that the presence of sulphur in substantial amount renders the hydrogenation selective. The sulphur may be present in any convenient form which will normally be as an organic sulphur compound. It is preferably in the form of a thiophenic compound. The sulphur may be added to the reaction system in any convenient way, a preferred method being by way of the hydocarbon feedstock. Thus a feedstock already containing sulphur may be chosen, or sulphur may be added to the feedstock. Alternatively sulphur may be added to the hydrogen-containing gas passing to the reaction zone or injected directly to the reaction zone. The amount of sulphur present in the reaction zone is desirably at least 0.2% by weight of feedstock processed and it may be in excess of 1% wt. Since it is believed that the action of the sulphur is to modify the catalyst surface, the catalyst may also be pretreated with a suitable sulphur compound, for example, a thiophene.

When operating in the presence of organic sulphur compounds, these compounds will normally be themselves converted as in conventional hydrocatalytic desulphurisation process to give hydrogen sulphide and a desulphurised organic compound.

When operating in the presence of sulphur it has been found that variation in the process conditions, while affecting the quantity of aromatics which are hydrogenated, does not significantly affect the selectivity of the hydrogenation. Process conditions may thus be selected from the following ranges.

Temperature 500°–900° F.—preferably 600°–800° F.
Pressure 100–3000 p.s.i.g.—preferably 400–2000
Liquid hourly space velocity 0.1–10 v./v./hr.
Hydrogen:hydrocarbon mole ratio 2:1–100:1

The hydrogen present is preferably added and not produced in situ in the reaction zone.

The preferred feedstock are naphthalene and substituted naphthalenes, for example methyl naphthalenes, which give on selective hydrogenation Tetralin or substituted Tetralins.

When operating under the above mentioned conditions it is possible to obtain selectivities in excess of 7% and more particularly in excess of 90%. The selectivity is defined as $$\frac{\text{Total partially hydrogenated products formed} \times 100}{\text{Total polycyclic aromatics converted}}$$

The platinum group metal containing catalyst preferably contains a platinum group metal on a refractory support. Preferred platinum group metal contents are 0.01 to 5% by weight of total catalyst, more particularly 0.1 to 2% wt. The preferred platinum group metal is platinum.

Any of the known refractory supports may be used, particularly suitable supports being inorganic oxides selected from Groups II to V of the Periodic Table. As is well known in the catalyst art, supports can range from those which are substantially inactive for hydrocarbon conversion to those which show considerable hydrocarbon conversion activity in themselves. Where it is required to have selective hydrogeneration as the principal reaction the support should have a low or moderate activity in itself, examples of suitable supports being magnesia, silica, sepiolite and alumina, the latter being preferred. If additional conversions are desirable, for example the simultaneous isomerisation of substituted polycyclic aromatics to move the position of the substituent, or the simultaneous isomerisation of the hydrocarbon rings to alter the number of carbon atoms in the rings, then an active support may be used. Examples of such supports are silica-alumina, silica-magnesia, natural or artificial zeolites, particularly those with a low alkali metal or alkali earth metal-content, and inorganic oxides containing combined halogen. The halogen may be chlorine or fluorine, preferably the latter and may be present in an amount of from 0.1 to 15% wt., preferably 1 to 10% wt. The preferred halogenatable inorganic oxides is alumina. The halogen may be added to the support in any convenient way, for example by impregnation of the support with an aqueous solution of halogen acid or by contacting the support with the vapour of an organic halogen-containing compound. When using a vapour process the halogen is preferably added to the support already containing the platinum group metal. Particularly preferred vapour phase fluorinating compounds and a particularly preferred method of fluorination are disclosed in the complete specification of U.K. Patent No. 956,684.

*Example 1*

A commercial grade of 1-methylnaphthalene containing 1.37% wt. of sulphur, present mainly in the form of thiophenic compounds, was hydrogenated over a commercially available gasoline reforming catalyst containing 0.58% wt. of platinum and 0.81% of chlorine, the balance being a high surface area alumina (400 m.²/g.).

The process conditions used and the results obtained are given in Table 1 below.

TABLE 1.—HYDROGENATION OF 1-METHYL NAPHTHALENE OVER Pt-Al₂O₃ CATALYSTS

| | Feedstock | Space velocity, v./v./hr. | | | | | | | | |
|---|---|---|---|---|---|---|---|---|---|---|
| | | 1.0 | 1.0 | 1.0 | 1.0 | 1.0 | 1.0 | 1.0 | 1.0 | 1.0 |
| | | Hydrogen:hydrocarbon, mol ratio | | | | | | | | |
| | | 20:1 | 20:1 | 20:1 | 20:1 | 20:1 | 20:1 | 20:1 | 20:1 | 20:1 |
| | | Pressure, p.s.i.g. | | | | | | | | |
| | | 150 | | | 400 | | | 1,000 | | |
| | | Temperature, °F. | | | | | | | | |
| | | 600 | 700 | 800 | 600 | 700 | 800 | 600 | 700 | 800 |
| Liquid recovery | | 100.5 | 96.2 | 94.5 | 101.5 | 101.9 | 100.9 | | 101.5 | 100.8 |
| Sulphur content | 1.37 | Not measured | | | 0.36 | 0.08 | 0.06 | 0.15 | 0.08 | 0.08 |
| Paraffin plus naphthenes (below C₉), percent wt | 0.2 | 0.3 | 0.4 | 0.7 | 0.3 | 0.6 | 0.6 | 0.5 | 0.6 | 1.7 |
| Alkylbenzenes, percent wt.: | | | | | | | | | | |
| C₆-C₈ | 0.3 | 4.8 | 5.0 | 4.1 | 3.9 | 6.3 | 5.9 | 5.0 | 6.5 | 17.4 |
| C₉-C₁₀ | | | | 0.2 | | | 0.2 | | | 1.1 |
| C₁₁ | | | | | | | | | | |
| Dimethylindans, percent wt | | | | | | | 0.5 | | | 1.6 |
| Methyltetralins, percent wt.: | | | | | | | | | | |
| 2-Me Tet | | | | | 0.7 | 12.1 | 9.6 | 2.5 | 19.3 | 17.3 |
| 1-Me Tet | | | | | | | | | | 0.4 |
| 6-Me Tet | | 2.9 | 12.3 | 5.2 | | | | | | |
| 5 Me Tet | | | | | 1.8 | 27.5 | 19.1 | 5.9 | 49.4 | 37.2 |
| Naphthalenes, percent wt.: | | | | | | | | | | |
| Naphthalene | | | | | | | 0.3 | | | 0.5 |
| 2-Me Naph | | | | | | | | | | 0.1 |
| 1-Me Naph | 94.4 | 91.3 | 82.3 | 89.5 | 92.5 | 53.5 | 64.8 | 85.8 | 24.2 | 22.7 |
| Methylbenzthiophens, percent wt | 5.1 | 0.7 | | | 0.8 | | | 0.3 | | |
| Total methyltetralins and dimethylindans formed, percent wt | | | 12.3 | | | 39.6 | 29.2 | 8.4 | 68.7 | 56.5 |
| Total naphthalenes converted, percent wt | | | 12.1 | | | 40.9 | 29.3 | 8.6 | 70.2 | 71.1 |
| Selectivity, percent | | | 100 | | | 97 | 100 | 98 | 98 | 79 |

It will be seen from the table that although a wide range of process conditions was used (i.e. temperatures from 600 to 800° F. and pressures of from 150 to 1000 p.s.i.g.) no significant quantity of Decalins was produced.

The selectivity of the catalyst for the production of partially hydrogenated products (Tetralins and indans) was always high, and even at 800° F. and 1000 p.s.i.g., where the selectivity had apparently dropped to 79%, it is clear from the quantities of $C_6$-$C_8$ compounds formed that this is due to the onset of selective ring opening and not to non-selective hydrogenation.

Other features shown by the table are:
(i) The appreciable desulphurisation obtained,
(ii) That temperature and pressure affect the conversion, the conversion passing through a maximum on going from 600 to 800° F., and increasing with increased pressure.
(iii) That some slight isomerisation to dimethylindans occurs at the higher temperatures and pressures.

*Example 2*

The platinum-alumina catalyst used in Example 1 was treated to add 6.0% wt. of fluorine by passing over it a gaseous mixture of equal volumes of carbon tetrafluoride and air (flow rate 5 v./v./min.) at 440° C. for 20 minutes.

This fluorinated catalyst was then used to hydrogenate the 1-methylnaphthalene feedstock of Example 1, the process conditions used and the results obtained being given in Table 2 below.

TABLE 2.—HYDROGENATION OF 1-METHYLNAPHTHALENE OVER FLUORINATED Pt-Al₂O₃ (6.0% wt. F)

| | Feedstock | Space velocity, v./v./hr. | | |
|---|---|---|---|---|
| | | 1.0 | 1.0 | 1.0 |
| | | Hydrogen:hydrocarbon, mol ratio | | |
| | | 20:1 | 20:1 | 20:1 |
| | | Pressure, p.s.i.g. | | |
| | | 400 | 400 | 400 |
| | | Temperature, °F. | | |
| | | 600 | 700 | 800 |
| Sulphur content, percent wt | 1.37 | 0.19 | 0.08 | 0.06 |
| Paraffins plus naphthenes (below C₉), percent wt | 0.2 | 0.1 | 0.8 | 1.9 |
| Alkylbenzenes, percent wt.: | | | | |
| C₆-C₈ | | | | |
| C₉-C₁₀ | 0.3 | 4.4 | 5.6 | 5.3 |
| C₁₁ | | | 0.2 | 2.9 |
| Dimethylindans, percent wt | | | 2.8 | 3.8 |
| Methyltetralins, percent wt.: | | | | |
| 2-Me Tet | | | | 4.0 |
| 1-Me Tet | | 0.8 | 8.0 | 2.9 |
| 6-Me Tet | | | 0.4 | 8.8 |
| 5-Me Tet | | 2.8 | 20.3 | 7.9 |
| Naphthalenes, percent wt.: | | | | |
| Naphthalene | | | | 0.3 |
| 2-Me Naph | | | 1.5 | 33.3 |
| 1-Me Naph | 94.4 | 91.2 | 63.1 | 28.9 |
| Selectivity for single ring hydrogenation, percent | | 100 | 97 | 86 |

The table shows the same high selectivity for single ring hydrogenation as in Example 1. However, the addition of the fluorine has increased the isomerisation activity of the catalyst, significant quantities of 2- and 6-methyltetralins and dimethylindans appearing in the product obtained at 800° F. Also selective ring opening has become more important, as evidenced by the formation of $C_{11}$ alkyl benzenes at the higher temperature.

I claim:

1. A process for selectively hydrogenating polycyclic aromatic hydrocarbons to achieve selectivity for partially hydrogenated hydrocarbons in excess of 75%, which comprises contacting the polycyclic aromatic hydrocarbon feedstock in a reaction zone with a hydrogenating catalyst consisting essentially of from 0.01% to 5% of a platinum group mental on a refractory support at a temperature of from 600° F. to 800° F., a pressure of from 400 p.s.i.g. to 2000 p.s.i.g., a liquid hourly space velocity of from 0.1 to 10 v./v./hr, in the presence of in excess of 1% wt. of sulphur by weight of feedstock processed, and in the presence of hydrogen, said hydrogen being present in a hydrogen to hydrocarbon mol ratio of from 2:1 to 100:1, and recovering a product having in excess of 75% of partially saturated hydrocarbons.

2. A process as claimed in claim 1 wherein the sulphur is in the form of a thiophenic compound.

3. A process as claimed in claim 1 wherein the platinum group metal content of the catalyst is from 0.1 to 2% wt.

4. A process as claimed in claim 1 wherein the platinum group metal is platinum.

5. A process as claimed in claim 1 wherein the polycyclic aromatic hydrocarbons are selected from the class consisting of naphthalene and substituted naphthalenes.

6. A process for selectively hydrogenating polycyclic aromatic hydrocarbons selected from the group consisting of naphathalene, substituted naphthalenes and mixtures thereof, to produce a product having in excess of 75% of single ring hydrogenated material selected from the group consisting of Tetralin, substituted Tetralin, and mixtures thereof, which comprises contacting the polycyclic aromatic hydrocarbon feedstock with a catalyst consisting essentially of from 0.01 to 5% of a platinum group metal on a refractory support at a temperature of from 600° F. to 800° F., a pressure of 400 p.s.i.g. to 2000 p.s.i.g., a liquid hourly space velocity of from 0.1 to 10 v./v./hr., in the presence of in excess of 1% wt. sulphur in the form of a thiophenic compound, and in the presence of hydrogen, said hydrogen being present in a hydrogen to hydrocarbon mol ratio of from 2:1 to 100:, and recovering a product having in excess of 75% of single ring hydrogenated material selected from the group consisting of Tetralin, substituted Tetralin, and mixtures thereof.

References Cited by the Examiner

UNITED STATES PATENTS 3,000,983   9/1961   Sanford et al. _____ 260—667

DELBERT E. GANTZ, *Primary Examiner.*

S. P. JONES, *Assistant Examiner.*

UNITED STATES PATENT OFFICE
CERTIFICATE OF CORRECTION

Patent No. 3,285,984                            November 15, 1966

Anthony George Goble

It is hereby certified that error appears in the above numbered patent requiring correction and that the said Letters Patent should read as corrected below.

Column 1, line 57, for "process" read -- processes --; column 2, line 10, for "7%" read -- 75% --; line 41, for "alkali earth" read -- alkaline earth --; column 6, line 19, for "2:1 to 100" read -- 2:1 to 100:1 --.

Signed and sealed this 12th day of September 1967.

(SEAL)
Attest:

ERNEST W. SWIDER                          EDWARD J. BRENNER
Attesting Officer                            Commissioner of Patents